F. L. STUART.
APPARATUS FOR UNLOADING AND LOADING.
APPLICATION FILED DEC. 5, 1917.
1,314,615.
Patented Sept. 2, 1919.
2 SHEETS—SHEET 1.
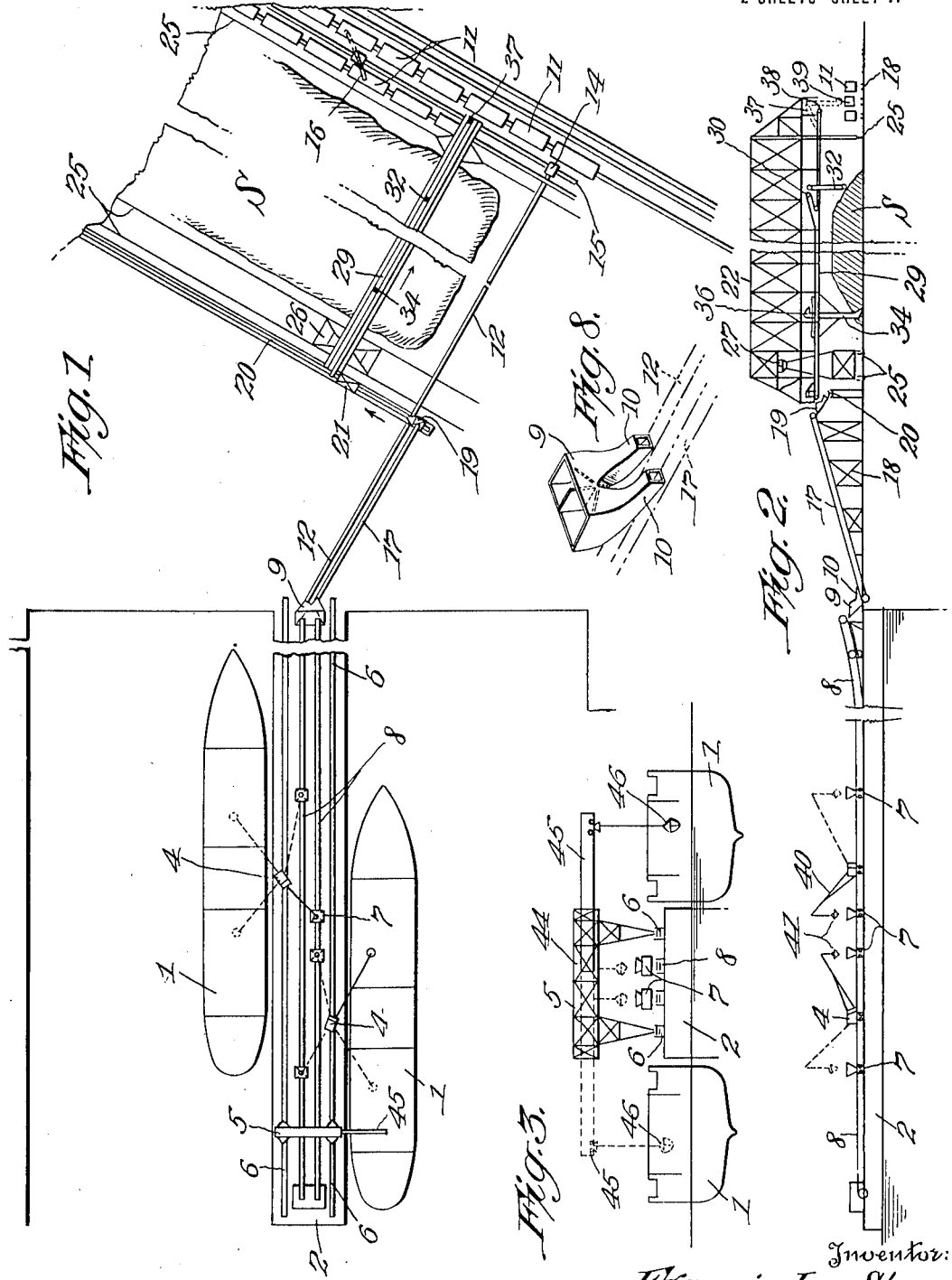
Inventor:
Francis Lee Stuart.
By his Attorneys:
Baldwin Wright
Witness:
P. F. Gathmann

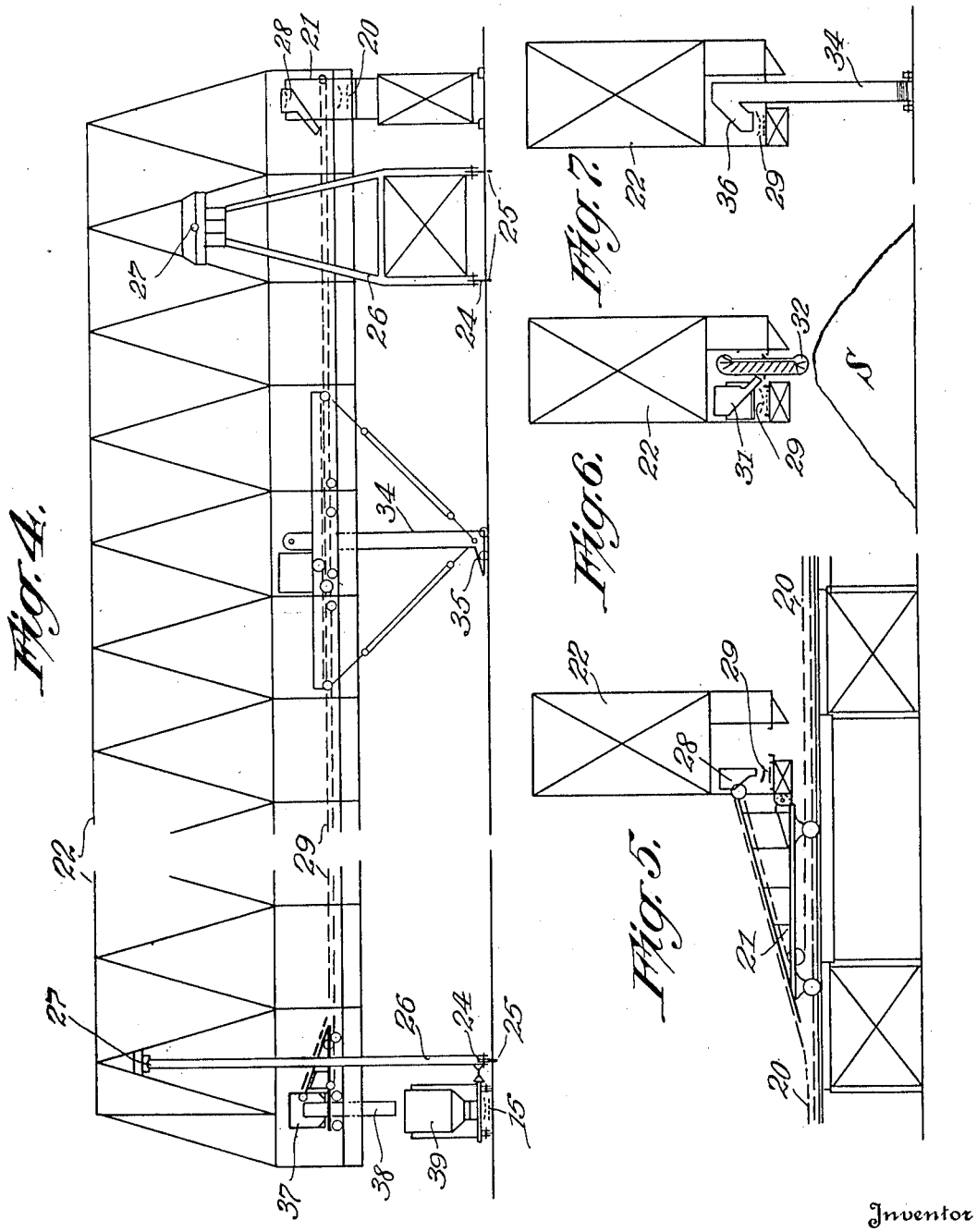

UNITED STATES PATENT OFFICE.

FRANCIS LEE STUART, OF WASHINGTON, DISTRICT OF COLUMBIA.

APPARATUS FOR UNLOADING AND LOADING.

1,314,615.      Specification of Letters Patent.      Patented Sept. 2, 1919.

Original application filed May 29, 1916, Serial No. 100,632. Divided and this application filed December 5, 1917. Serial No. 205,608.

*To all whom it may concern:*

Be it known that I, FRANCIS LEE STUART, a citizen of the United States, and a resident of the city of Washington, in the District of Columbia, have invented certain new and useful Improvements in Apparatus for Unloading and Loading, of which the following is a specification.

This invention relates broadly to apparatus for unloading coal, ore, and other material from cars, barges or other vessels or carriers and transferring the same to devices to be loaded or to storage.

The principal object of the present invention is to provide an apparatus for loading material from either of two sources, one of said sources being supplied at desired intervals by the other.

A further object of the present invention is to provide an unloading and loading apparatus of this type which will be effective for unloading material from any desired source of supply and transferring the same either to storage or to a suitable carrier, and having means for reclaiming the stored material and delivering the same to said carrier.

The accompanying drawings are for the most part diagrammatic, as my invention can be fully and best illustrated in this way. The details of construction of the individual units may be considerably varied, but in other copending applications I have shown more fully the specific construction of some of the novel parts of the apparatus.

This application is a division of my copending application Serial No. 100,632 filed May 29, 1916, and is directed more particularly to the unloading feature in combination with the loading conveying mechanism.

Figure 1 shows diagrammatically apparatus for transferring material from boats to conveyers which deliver the material to a bridge conveyer, or to other conveyers, which carry it to places of storage or to other carriers.

Fig. 2 shows the same mechanism in elevation.

Fig. 3 shows in elevation some of the mechanism of Fig. 1.

Fig. 4 is a front elevation of the bridge and associated mechanism.

Fig. 5 is a side elevation showing a conveyer belt delivering to the bridge conveyer through a tripper attached to and movable with the bridge.

Fig. 6 is an end view, illustrating mechanism for lowering material from the bridge conveyer.

Fig. 7 is an elevational view, showing the reclaiming elevator associated with the bridge conveyer.

Fig. 8 is a detail view of the main supply hopper.

In loading carriers from a source of supply, such as a barge, it frequently happens that the available cargo of the barge is emptied before the carriers are completely loaded. Unless a reserve or storage supply is employed in connection with such barges, considerable delay in the proper handling of material is occasioned. It is the purpose of the present invention to expedite the handling of material by providing a storage supply coöperating with the main source of supply and acting as a reserve which may be replenished from time to time from the main source of supply when no carriers for loading are available, and which may in turn be utilized as a source of supply when there is no cargo to be unloaded and used in this capacity.

Referring more particularly to the drawings, I have illustrated diagrammatically a main source of supply in the form of vessels or barges 1 positioned on opposite sides of a wharf or pier 2 for unloading. Cranes 4 and 5 traveling throughout the length of the wharf on the tracks 6 are utilized for unloading the material from the vessels and delivering the same to hoppers 7 movable along the conveying belts 8 to which they discharge in any well known manner. The conveyers 8 in turn discharge into a hopper 9 having independent outlets 10 controlled by means of adjustable gates or the like as is common in devices of this nature.

The hopper 9, with its delivery mechanism, constitutes the main source of supply which may be utilized either for supplying material to carriers to be loaded, or to a storage or secondary source of supply. When it is desired to transfer the material from the hopper 9 directly to carriers 11, here indicated as being cars, the proper outlet gate is opened and the material permitted to pass onto the conveyer 12, delivering to a hopper 14 which in turn discharges to the conveyer 15 supplying material to the loading trimmer 16 depositing the same in the cars or other carriers 11. It will be understood that the trimmer 16 is adjustable between adjacent carriers so as to be placed in loading relation thereto.

In case there are no carriers to be loaded, it is necessary in order to prevent delay, to transfer the material from the hopper 9 to the storage pile or secondary source of supply S. This may be readily accomplished by opening the proper outlet 10 delivering to the conveyer 17 passing over an inclined supporting framework 18 and delivering at its upper end to a hopper 19. This hopper in turn delivers to the elevated conveyer 20 passing over a tripper 21 secured to the framework 22 of a bridge conveyer. The bridge conveyer framework is carried by trucks 24 adjustable on the tracks 25 so that the bridge conveyer may be moved to any position over the storage pile S. The standards 26, carrying the supporting trucks, have pivotal connections 27 with the main frame 22 of the bridge conveyer. The tripper 21 being connected to the bridge travels therewith, and is arranged to discharge material into the hopper 28 delivering to the conveyer 29 extending transversely of the bridge. For lowering material from the bridge conveyer to the storage pile, the conveyer is equipped with a traveling tripper 30, delivering to the hopper 31 supplying the lowerator 32, which may comprise a bucket conveyer or the like of any well known construction. In this manner the material is transferred from the loading apparatus to the storage pile as gently as possible to prevent breakage of the same.

When the supply of material to be unloaded has been exhausted, loading of the carriers may be continued uninterruptedly through the reclaiming apparatus 34 described and claimed more particularly in my copending application Ser. No. 98,889, filed May 10, 1916. As here shown diagrammatically, this apparatus comprises an elevating conveyer having a plow portion 35 adapted to underrun the material in storage so as to bring the same into position to be lifted by the elevating conveyer which in turn delivers through the outlet 36 to the bridge conveyer. The material thus supplied, or reclaimed from storage, travels to the opposite end of the bridge conveyer where it is discharged into the hopper 37 supplying the chute or lowerator 38, in turn delivering into the hopper 39 movable with the bridge 22 and depositing the material upon the belt conveyer 15, heretofore described, and movable in either direction for supplying the loading trimmer 16 as pointed out in connection with the main supply system.

The unloading cranes 4 are illustrated more particularly in Fig. 2 as comprising ordinary swinging derrick arms 40 having grab buckets or the like 41. In Fig. 3 the modified unloading devices or cranes 5 are illustrated as comprising a cage 44 supporting an extensible arm 45 equipped with hoisting grab buckets 46.

From the foregoing it will be obvious that material may be transferred from the vessels 1 directly to the carriers 11, or may be transferred from the vessels directly to the storage S, which may in turn be utilized as a secondary source of supply for loading the carriers in case of necessity. By reason of this construction, and the coöperation of the conveyers permitting the substitution of one source of supply for the other thereby avoiding interruption of the loading process, it is possible to save a great deal of time and labor which has heretofore been lost. The bridge conveyer with its lowerators, reclaimer and trippers may be considered as a connecting mechanism coöperating with the unloading and loading devices to facilitate storing and reclaiming material at will.

What I claim is:—

1. In a system of loading and unloading, apparatus for loading cars and other carriers, apparatus for unloading material from vessels or other carriers, a conveyer to which said unloading apparatus delivers, a hopper receiving material from said conveyer, a conveyer to which said hopper delivers, an additional conveyer receiving material from said last-mentioned conveyer and which delivers to said loading apparatus, a space for storage, means for delivering material from said storage space to the said additional conveyer, and means for conveying material from said hopper to said storage space.

2. In a system of loading and unloading, traveling unloading apparatus, a traveling hopper receiving material therefrom, a belt conveyer over which said traveling hopper moves and to which it delivers, a receiving hopper having a plurality of outlets to which said belt conveyer delivers, loading apparatus, means for conveying material from said last mentioned hopper to said loading apparatus, a space for storage, and belt conveyers for carrying material, from said last mentioned hopper to said storage space.

3. In a system of loading and unloading, traveling unloading apparatus, a traveling hopper movable independently of said apparatus and receiving material therefrom, a belt conveyer over which said hopper moves and to which it delivers, a double discharge receiving hopper to which said belt conveyer delivers, loading apparatus, means for conveying material from said double discharge hopper to said loading apparatus, a space for storage, and belt conveyers for carrying material from said double discharge hopper to said storage space.

4. In a loading and unloading system, traveling unloading apparatus, a traveling hopper movable independently of said apparatus and receiving material therefrom, a belt conveyer over which said traveling hopper moves, a double discharge receiving hopper to which said belt conveyer delivers, loading apparatus, means for conveying material from said double discharge hopper to said loading apparatus, a space for storage, a traveling bridge arranged over said space, belt conveyers for carrying said material from said hopper to said bridge, and means on the bridge for delivering to said storage space.

In testimony whereof, I have hereunto subscribed my name.

FRANCIS LEE STUART.